US008813118B2

(12) United States Patent
Bhatnagar et al.

(10) Patent No.: US 8,813,118 B2
(45) Date of Patent: Aug. 19, 2014

(54) INTERACTIVE CONTENT FOR MEDIA CONTENT ACCESS SYSTEMS AND METHODS

(75) Inventors: Avneesh Bhatnagar, Irving, TX (US); Chethan Makam, Waltham, MA (US); Swapneel Desai, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 921 days.

(21) Appl. No.: 11/542,353

(22) Filed: Oct. 3, 2006

(65) Prior Publication Data
US 2008/0092158 A1   Apr. 17, 2008

(51) Int. Cl.
*H04N 7/025* (2006.01)
*H04N 7/173* (2011.01)
*H04N 5/445* (2011.01)

(52) U.S. Cl.
USPC .................................. 725/32; 725/35; 725/43

(58) Field of Classification Search
CPC ............ H04N 21/812; H04N 21/4316; H04N 21/25883
USPC ......................... 725/32, 34–43, 44, 50–52, 46
See application file for complete search history.

(56) References Cited

U.S. PATENT DOCUMENTS

| | | | |
|---|---|---|---|
| 7,945,484 B1* | 5/2011 | Tam et al. ................... 705/26.41 |
| 2001/0034763 A1* | 10/2001 | Jacobs et al. .................. 709/204 |
| 2002/0010928 A1* | 1/2002 | Sahota ............................ 725/40 |
| 2002/0133405 A1* | 9/2002 | Newnam et al. ................ 705/14 |
| 2002/0162117 A1* | 10/2002 | Pearson et al. ................ 725/109 |
| 2003/0028873 A1* | 2/2003 | Lemmons ....................... 725/36 |
| 2004/0111742 A1* | 6/2004 | Hendricks et al. .............. 725/34 |
| 2006/0015925 A1* | 1/2006 | Logan ........................... 725/135 |
| 2007/0022442 A1* | 1/2007 | Gil et al. ......................... 725/62 |
| 2008/0141303 A1* | 6/2008 | Walker et al. ................... 725/39 |

* cited by examiner

*Primary Examiner* — Benjamin R Bruckart
*Assistant Examiner* — Jason Thomas

(57) ABSTRACT

In one of many possible embodiments, a system includes a content delivery subsystem providing an enhanced content data stream, which includes media content from a first source and interactive advertising content from a second source. The system further includes a content processing subsystem communicatively coupled to the media content delivery subsystem. The content processing subsystem is configured to receive the enhanced content data stream, provide at least a component of the media content instance for presentation to a user, and provide at least a subset of the interactive advertising content for concurrent presentation of both the component of the media content and the subset of the interactive advertising content to the user.

33 Claims, 9 Drawing Sheets

INTERACTIVE CONTENT FOR MEDIA CONTENT ACCESS SYSTEMS AND METHODS

BACKGROUND INFORMATION

The advent of computers, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs also support an increasing number of two-way digital services such as video-on-demand, internet protocol television (IPTV), and personal video recording.

An STB is typically connected to a cable or satellite, or generally, a subscriber television system, and includes hardware and software necessary to provide the functionality of the subscriber television system at a user site. While many STBs are stand-alone devices that are externally connected to a television, an STB and/or its functionality may be integrated into a television or personal computer, a mobile device such as a mobile phone or a personal digital assistant (PDA), or even into an audio device such as a programmable radio.

An STB is usually configured to provide users with a large number and variety of media content choices. For example, a user may choose to experience a variety of broadcast television programs, pay-per-view services, video-on-demand programming, and audio programming via an STB.

The popularity of services that are accessible through STBs has attracted advertisers. Traditionally, an advertiser pays a fixed fee for an advertisement to be broadcast over a subscriber television system during a particular time slot. However, such advertising arrangements are rather limiting for users, service providers, and advertisers. For example, a user who views a particular advertisement has little or no control over the information being presented. Moreover, the user typically has to take nontrivial, disconnected action in order to contact an advertiser, obtain the advertised services or products, or even access additional information about the advertised services or products. For instance, a user may have to write down contact information (e.g., a telephone number or web address) for use in contacting the advertiser at a later time, or the user may have to navigate away from media content (e.g., a television program) being presented in order to contact the advertiser or access additional information (e.g. by switching to another programming channel such as a dedicated advertising channel). The nontrivial and disconnected nature of these actions may cause a user not to respond to an advertisement even though the user initially felt a desire to do so when experiencing the advertisement.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Figure 1:
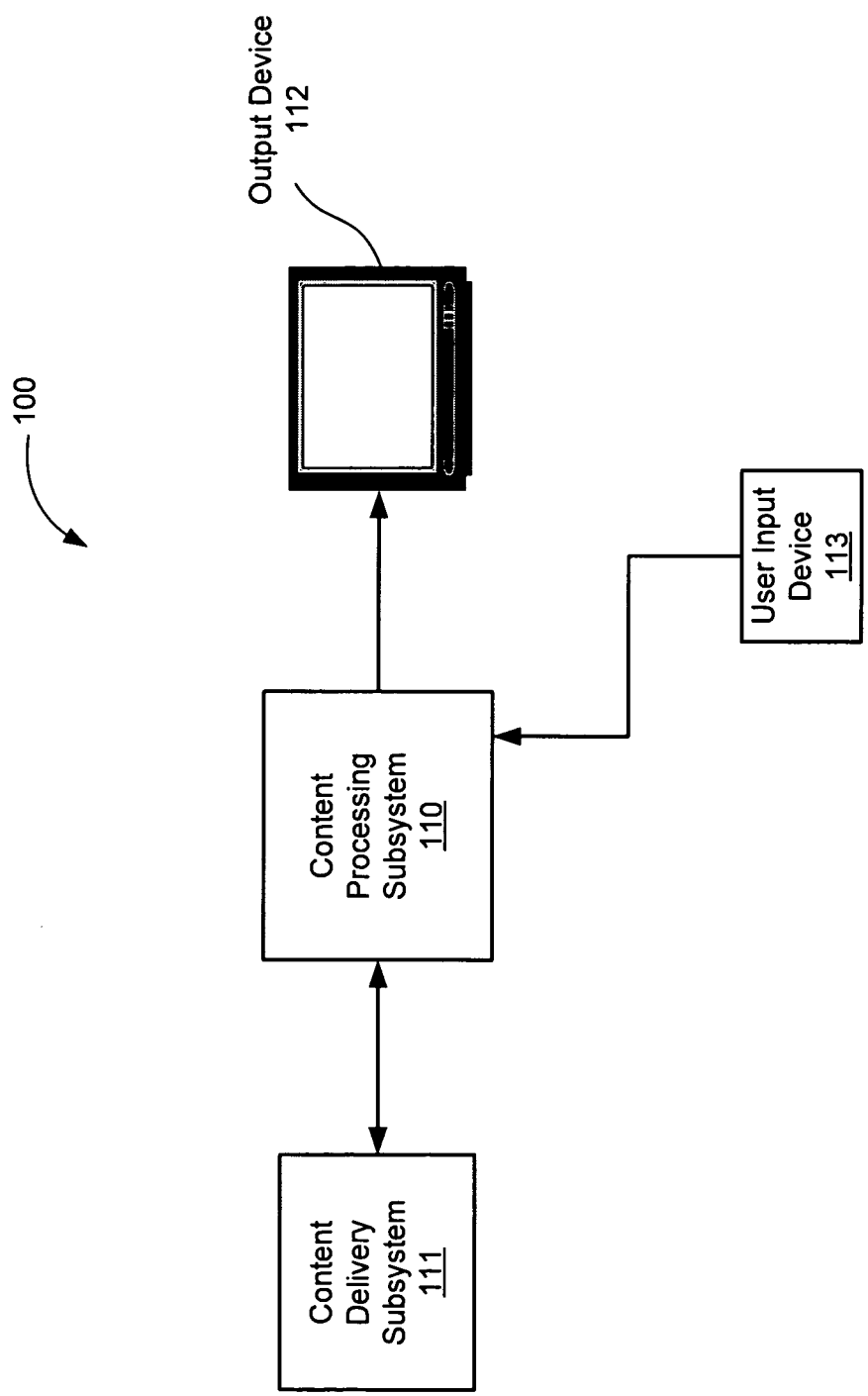
FIG. 1 illustrates an example of a media content access system, according to an embodiment.

Preferred exemplary systems and methods for providing interactive content together with media content are described herein. The interactive content can be presented generally without obstructing the presentation of the media content, such that a user may be provided with convenient access to interactive content while also being able to continue experiencing a presentation of media content. The user is able to utilize the interactive content to perform interactive actions related to the content. In embodiments in which the interactive content includes interactive advertising content, for example, the interactive actions may include accessing additional information related to advertised products or services, contacting advertisers, and ordering or otherwise accessing the advertised products or services.

As used herein, the term "interactive content" will be used to refer generally to any content configured to enable a user to interact with an electronic device (e.g., a set-top box and/or server) associated with the presentation of content. The interactive content may include interactive advertising content. As used herein, the term "interactive advertising content" will be used to refer generally to any advertising content that includes interactive content configured to enable a user to interact with an electronic device (e.g., a set-top box and/or server) associated with the presentation of advertising content. Examples of interactive content include, but are not limited to, shortcuts (e.g., hyperlinks) to additional information and/or functionality related to the advertising content (including information and/or functionality provided by third parties), including any suitable tools (e.g., a mini-browser or telephone services interface) for placing an order, providing information, providing payment, initiating communications (e.g., voice or e-mail communication), or otherwise accessing additional information or functionality.

A concurrent presentation of interactive advertising content and media content enables a user to experience media content while also being able to perform interactive functions associated with and/or in response to advertising content. For example, during presentation of media content such as a sporting event or a commercial sponsored by Pizza Hut®, interactive advertising content may also be presented to a user. The interactive advertising content may include a menu of directory listings, such as business listings corresponding with Pizza Hut® locations located proximate to the user. The directory listings may include interactive content enabling the user to access additional information and/or functionality, including accessing menu or "specials" information, initiating a voice call to a Pizza Hut® location, or placing an order to a Pizza Hut® location online, for example, all while the media content continues to be presented for experiencing by the user.

Accordingly, the likelihood that users will respond to an advertisement may generally increase because of the convenience associated with a user being able to seamlessly access additional information and/or functionality related to the advertisement. Significantly, a user may be more likely to respond to an advertisement because he is able to do so while still experiencing media content.

In addition, user responses to advertisements can be measured when the interactive advertising content is used to access additional information and/or functionality. For example, selections of interactive content (e.g., clicking a hyperlink) and/or utilizations of interactive content to initiate communications or place orders can be tracked and associated with the corresponding advertising content. This allows advertisers and service providers to measure the effectiveness of advertisements based on the actual measured value produced by advertisements. Consequently, advertising costs and revenues can be determined and/or shared based on the actual value produced by advertisements.

Components and functions of exemplary embodiments of systems and methods for providing interactive advertising content will now be described in more detail.

II. Exemplary System View

FIG. 1 illustrates an example of a media content access system 100, according to one embodiment. Media content access system 100 may take many different forms and include multiple and/or alternate components and facilities.

As shown in FIG. 1, media content access system 100 may include a content processing subsystem 110 configured to communicate with and receive a data stream (i.e., a media content stream) containing media content from a content delivery subsystem 111. As described further below, the data stream provided by the content delivery subsystem 111 can comprise an enhanced content data stream, which may include data representative of both media content and interactive advertising content.

The content processing subsystem 110 and content delivery subsystem 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Session Initiation Protocol ("SIP"), socket connections, Ethernet, and other suitable communications networks and technologies. In certain exemplary embodiments, the content processing subsystem 110 and content delivery subsystem 111 are configured to communicate via a broadband network capable of delivering different services (e.g., media content services, Internet access services, and voice communication services) to the content processing subsystem 110.

The content processing subsystem 110 may be configured to process the data stream provided by the content delivery subsystem 111 and provide a signal to an output device 112 such that the output device 112 may present content included in the data stream. In this manner, the content processing subsystem 110 may cause media content and interactive advertising content to be presented for experiencing by a user of the content processing subsystem 110. The presentation of the content may include, but is not limited to, displaying, playing back, or otherwise providing a media content instance, or at least a component (e.g., video and/or audio components) of the media content instance, together with interactive advertising content such that both may be experienced by the user.

As will be described in more detail below, the content processing subsystem 110 may be controlled by a user input device 113. Through the user input device 113, a user of the content processing subsystem 110 may utilize the interactive advertising content being presented to interact with one or more electronic devices associated with the presentation of the content. Accordingly, the user is able to use the interactive content to access additional information and/or functionality, as described below.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Content Delivery Subsystem

As mentioned above, content delivery subsystem 111 may be configured to deliver an enhanced content data stream to the content processing subsystem 110. The enhanced content data stream may include media content (e.g., a media content instance), interactive advertising content, and any other content and/or services that may be potentially useful for a user of the content processing subsystem 110.

Figure 2:
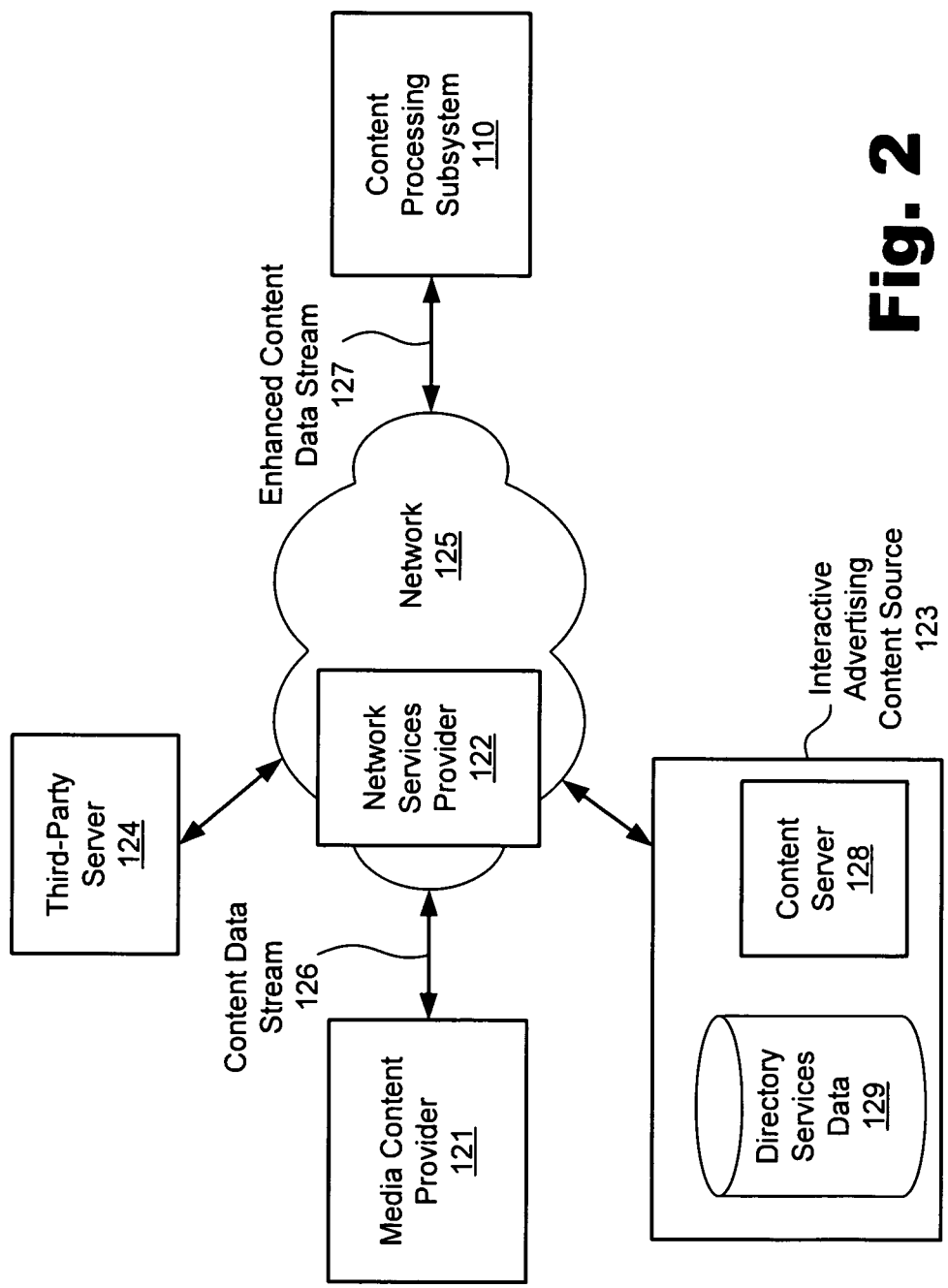
FIG. 2 is an illustration of an exemplary media content access network, according to an embodiment.

Content delivery subsystem 111 may include one or more sources of content and/or services, including, for example, a media content provider 121, network services provider 122, interactive advertising content source 123, and third-party server 124, which may be configured to communicate with one another as shown in FIG. 2 and using any suitable technologies, including any of the communication technologies described herein.

As described in more detail below, services and/or content provided by the media content provider 121, interactive advertising content source 123, third-party server 124, and network services provider 122 may be made available on a network 125 for accessing by the content processing subsystem 110. The network 125 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo® network), an optical fiber network, any other suitable network, and any combination of these networks. In certain embodiments, the network 125 includes a broadband network configured to provide the content processing subsystem 110 with access to various services, including media content broadcast services, Internet services, and voice communication services, for example. A user of the content processing subsystem 110 may subscribe to any combination of services provided over a broadband network.

Media content provider 121, network services provider 122, interactive advertising content source 123, and third-party server 124 may provide content and/or services to be made available on the network 125. As shown in FIG. 2, for example, media content provider 121 may be configured to provide a content data stream 126, which may include media content. The media content may include one or more media content instances, which term, as used herein, refers generally to any television program, on-demand program, pay-per-view program, broadcast media program, video-on demand program, commercial, advertisement, video, multimedia, movie, song, photograph, audio programming, or any segment, portion, component, or combination of these or other forms of media content that may be presented to and experienced (e.g., viewed) by a user. A media content instance may have one or more components. For example, an exemplary media content instance may include a video component and an audio component.

Media content provider 121 may include one or more devices (e.g., a server) for providing media content to be placed on the network 125. Typically, media content is included in media content stream 126, which may be directed to the content processing subsystem 110 or another node connected to the network 125. For example, network services provider 122 may include one or more devices or nodes (e.g., devices at a headend unit, a base station, or a central office) that can receive and process the content data stream 126, including appending content to the data stream 126 and/or putting the data stream 126 in a format suitable for transmission over the network 125.

Network services provider 122 may be configured to enhance the content data stream 126 by adding additional content to it to form an enhanced content data stream 127. In certain embodiments, the additional content includes interactive advertising content. The interactive advertising content may be appended to the content data stream 126 in any suitable manner such that the enhanced content data stream 127 includes both media content and interactive advertising content.

Network services provider 122 may obtain interactive advertising content from the interactive advertising content source 123, which may be integrated with or external of the network services provider 122. The interactive advertising content source 123 may include one or more data stores and devices (e.g., content server 128) configured to store and provide data representative of interactive advertising content to the network services provider 122. The interactive advertising content source 123 may include or be operated by one or more advertising or interactive content services (e.g., directory services).

The interactive advertising content may include any advertising content having interactive content. In certain embodiments, the interactive advertising content includes directory services data 129, which may include electronic listings (e.g., business listings) maintained by a directory services application. The listings may include advertising content (e.g., business information) and interactive content configured to provide access to additional information and/or functionality associated with the advertising content or an advertiser. In certain embodiments, for example, a listing may include one or more shortcuts (e.g., hyperlinks) to additional information and/or functionality associated with an advertiser and/or for communicating with the advertiser. For instance, a shortcut may include a hyperlink to a web site operated by the advertiser (e.g., through third-party server 124), a hyperlink to a phone service application configured to initiate a call to the advertiser, or a hyperlink to an e-mail service application configured to instantiate an e-mail message directed to the advertiser. Examples of interactive advertising content will be described further below with reference to FIGS. 6 and 7.

The network service provider 122 may be configured to selectively access and add interactive advertising content to the content data stream 126. Selection of interactive advertising content may be based on one or more predefined criteria, including, but not limited to, information included in the content data stream 126 (e.g., content descriptor tags and target destination of the stream 126), services or products associated with advertising content, categories of the services or products, prices of services or products advertiser name or other identifier, advertiser location (e.g., area code, street address, or zip code), advertiser shipping capabilities, advertiser hours of operation, and subscriber attributes (e.g., subscriber location). Accordingly, interactive advertising content may be selected and added to the content data stream 126 based on location, context, or both location and context.

The content data stream 126 may include information (e.g., metadata) useful for identifying advertising content that is related to the media content included in the data stream 126. For example, the content data stream 126 may include data such as a content descriptor tag that is indicative of the name (e.g., COPS), genre (e.g., football game), content (e.g., placement of a Coca-Cola® product), sponsor (e.g., Pizza Hut® for a commercial sponsored by Pizza Hut®), or other attribute of a media content instance included in the data stream 126. Network services provider 122 may use such information as criteria for selecting interactive advertising content to be added to the data stream 126. In other words, selected interactive advertising content may be tied to the context of a media content instance being provided.

Context-based selection of interactive advertising content may be performed dynamically such that changes in media content can cause different interactive advertising content to be selected and added to the content data stream 126 that ultimately becomes enhanced content data stream 127. Thus, the interactive advertising content can be selected to provide users with access to additional information and functionality that is related to the contents or attributes of the media content to be presented. For example, interactive listings associated with Pizza Hut® locations may be presented during presentation of a Pizza Hut® commercial. The capability to provide context-based interactive advertising content is a significance improvement over conventional dedicated advertising channels, which are dedicated solely to advertising content and consequently do not provide advertising content that is based on the context of a media content instance.

Additionally or alternatively, the selection of interactive advertising content to be appended to the content data stream 126 may be location-based. For example, a location-based selection may be based generally on the geographic areas to which the enhanced content data stream 127 will be provided by the network services provider 122. For example, the network services provider 122 may include a node configured to serve a certain geographic area. The node may be configured to select and add interactive advertising content that is associated with these geographic areas, including interactive advertising content associated with advertisers offering products and/or services within or proximate to the geographic areas. In certain embodiments, for example, the node may be configured to identify advertising content (e.g., directory listings) having zip codes (or other geographic identifier(s)) corresponding to a geographic region. Accordingly, region-specific interactive advertising content can be selected and provided to the content processing subsystem 110 along with media content included in the content data stream 126.

By selecting interactive advertising content based on criteria such as context and/or location, network services provider 122 can generally increase the relevancy of advertising content being provided. A user may be presented with interactive advertising content associated with the media content being experienced and/or associated with advertisers offering products or services to a geographic area that includes or is proximate to the location of the user, or to a geographic area that includes or is proximate to a location specified by the user. In certain embodiments, for example, the user may select a particular geographic area (e.g., by selecting a zip code) in order to receive interactive advertising content associated with the selected geographic area. For example, the user may select a zip code associated with a travel destination in order to receive interactive content such as hotel offers at the travel destination. By selecting interactive advertising content based on criteria such as context and/or location (including user-specified content and/or location), interactive advertising content may be provided in a targeted manner, which may improve the effectiveness of the content in generating sales or requests for additional information.

As described further below, the third-party server 124 may provide additional information and/or functionality to the content processing subsystem 110 over the network 125 in response to interactive input being initiated by a user of the content processing subsystem 110. Accordingly, the content processing subsystem 110 may have access to both a primary source of content (e.g., the media content provider 121 and/or network services provider 122) and another source of content (e.g., the interactive advertising content source 123 and/or third-party server 124). As described below, interactive content may be received from both the primary source and other sources and presented together for experiencing and use by a user of the content processing subsystem 110.

While FIG. 2 shows a single media content provider 121, network services provider 122, interactive advertising source 123, third-party server 124, and network 125, other embodiments may include multiple instances of any of these elements.

B. Content Processing Subsystem

The content processing subsystem 110 may be configured to receive and process the enhanced content data stream 127, including using data included in the data stream 127 to generate output to be presented to a user by the output device 112.

Figure 3:
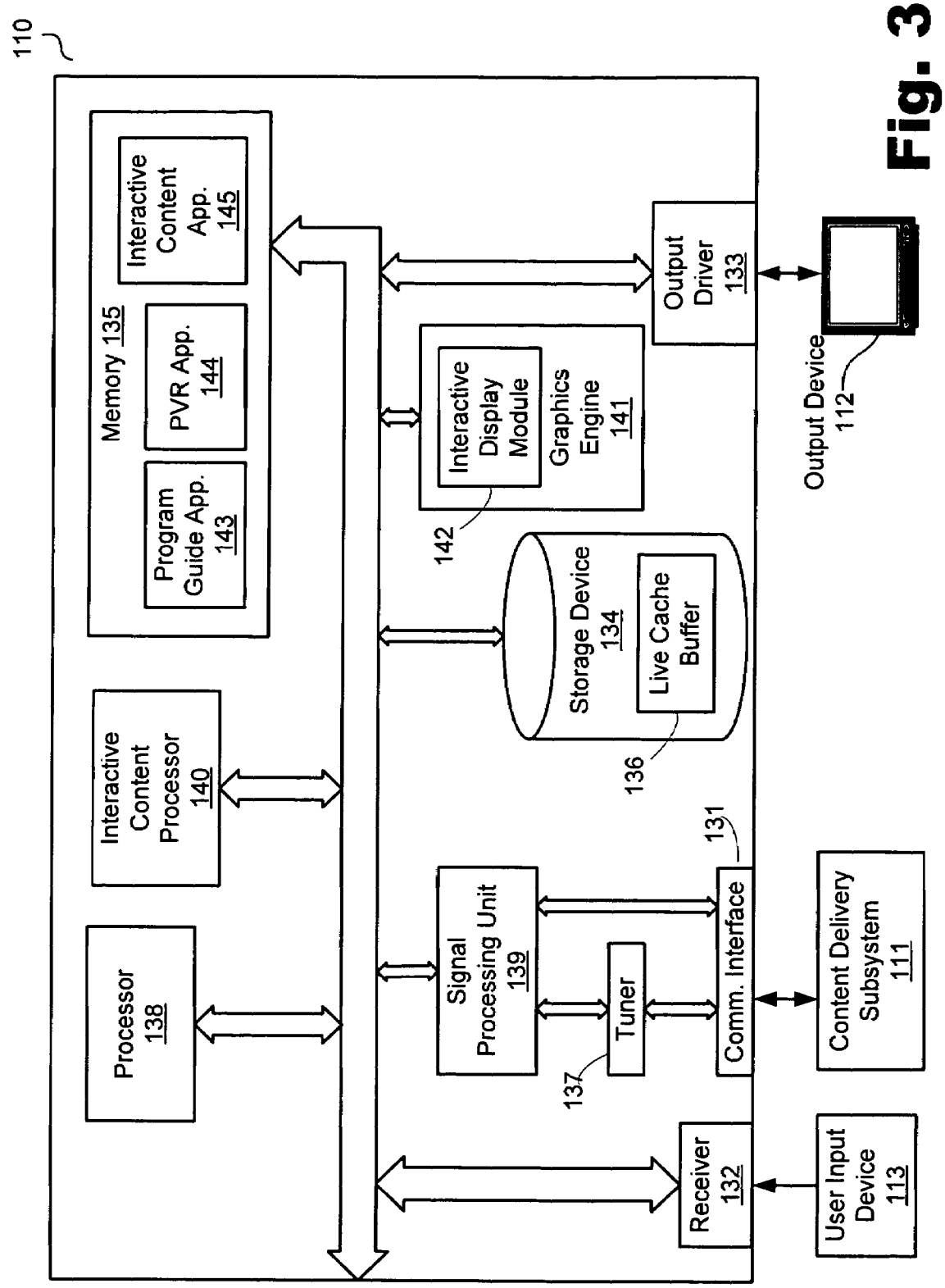
FIG. 3 is a block diagram of an exemplary content processing subsystem, according to an embodiment.

FIG. 3 is a block diagram of an exemplary content processing subsystem 110 (or simply "processing subsystem 110") according to an exemplary embodiment. The processing subsystem 110 may include any combination of hardware, software, and firmware configured to process an incoming media content stream such as the enhanced content data stream 127. The processing subsystem 110 may include any device or devices configured to receive an enhanced content data stream 127, process the media content and interactive content included in the enhanced content data stream 127, and provide the media content and the interactive content to an output device for concurrent presentation to a user. For example, an exemplary processing subsystem 110 may include, but is not limited to, a set-top box (STB), home communication terminal (HCT), digital home communication terminal (DHCT), stand-alone personal video recorder (PVR), digital video disc (DVD) player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive content from the content delivery subsystem 111. The communication interface 131 may include any device, logic, and other technologies suitable for receiving signals and/or data representative of content, including the enhanced content data stream 127. In certain embodiments, the communication interface 131 may include a single port configured to receive content from different sources such as the media content provider 121, network services provider 122, and one or more third-party devices (e.g., third party server 124). For example, the communication interface 131 may include or be connected to a broadband connection, which can enable processing subsystem 110 to receive content and/or services from different sources on a single port. In other embodiments, multiple ports may be used. The communication interface 131 can be configured to interface with any suitable communication media, protocols, and formats, including any of those mentioned above.

The processing subsystem 110 may also include a receiver 132 configured to receive input commands from the user input device 113. The user input device 113 may include, for example, a remote control, keyboard, game controller, or any other suitable input device (e.g., mobile devices such as personal digital assistants (PDAs) and mobile phones) that may be configured to communicate with the receiver 132 via a wireless link (e.g., an IR link), electrical connection, or any other suitable communication link.

Figure 4:
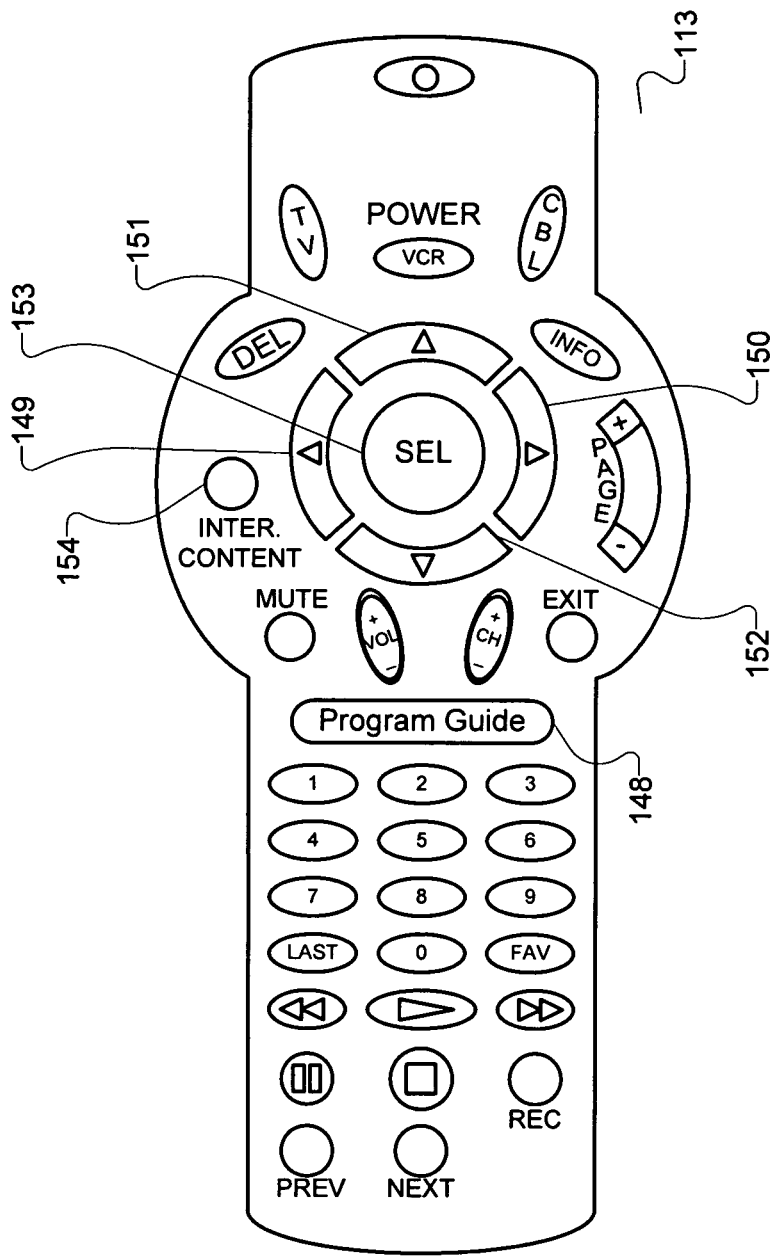
FIG. 4 illustrates an exemplary remote control user input device, according to an embodiment.

An exemplary remote control user input device 113 is illustrated in FIG. 4. In some examples, the input device 113 may be configured to enable a user to provide various commands and other input signals for controlling presentation of media content and/or interacting with interactive advertising content. For example, as illustrated in FIG. 4, a program guide button 148 may be configured to evoke the display of a program guide on the output device 112. A "left arrow" button 149, "right arrow" button 150, "up arrow" button 151, and "down arrow" button 152 may be included and configured to enable the user to navigate through various views and menus displayed by the output device 112. A "select" button 153 may be provided for selecting menu options, including instances of interactive content. An "interactive content" button 154 may be configured to launch or close a display of interactive content. The input device 113 shown in FIG. 4 is merely illustrative of the many different types of user input devices that may be used in connection with the present systems and methods.

Returning to FIG. 3, the processing subsystem 110 may also include an output driver 133 configured to interface with or drive the output device 112, including video and audio devices. The output driver 133 may include any combination of hardware, software, and firmware as may serve a particular application.

The output device 112 may include one or more devices configured to present (e.g., display, play, or otherwise provide) the media content for experiencing by a user. The output device 112 may include, but is not limited to, a display (e.g., a display screen), a television, computer monitor, handheld device, speaker, or any other device configured to present the media content. As is well known, the output device 112 may receive and process output signals from the content processing subsystem 110 such that content of the output signals is presented for experiencing by the user.

While FIG. 1 illustrates the output device 112 as being a device separate from and communicatively coupled to the content processing subsystem 110, this is exemplary only and not limiting. In other embodiments, the output device 112 and the content processing subsystem 110 may be integrated into one physical device. For example, the output device 112 may include a display (e.g., a display screen) integrated in the content processing subsystem 110.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem 110 may also include memory 135. Memory 135 may include, but is not limited to, FLASH memory, random access memory (RAM), dynamic RAM (DRAM), or a combination thereof. In some examples, as will be described in more detail below, various applications (e.g., a PVR application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. The live cache buffer 136 can provide fast access to recently accessed data or content. Media content data may be temporarily stored in the live cache buffer 136 to facilitate viewing of the media content in one or more trick play modes.

3. Tuner

Tuner 137 is configured to selectively receive content (e.g., media content and interactive content) carried on a particular media (e.g., television) channel, stream, address, frequency or other carrier. For example, tuner 137 may be tuned to a particular media channel such that the content carried on the media channel is received and can be processed by the processing subsystem 110.

In some examples, the processing subsystem 110 may include multiple tuners 137 such that content carried on different media channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

While tuner 137 may be used to receive various types of media-content-carrying signals broadcast by content delivery subsystem 111, content processing subsystem 110 may be configured to receive other types of content signals (including media content signals) from the content delivery subsystem 111 without using a tuner. For example, content delivery subsystem 111 may broadcast digital streams of data packets (e.g., Internet Protocol (IP) based data packets) that can be received without using a tuner. For such types of content signals, the communication interface 131 may receive and forward the signals directly to the signal processing unit 139 without going through the tuner 137. For an IP-based signal, for example, the signal processing unit 139 may function as an IP receiver or transceiver (e.g., a modem).

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming content, including content included in the enhanced content data stream 127. The signal processing unit 139 may be configured, for example, to demodulate and parse encoded digital media content. In some examples, the processing subsystem 110 may include one or more signal processing units 139 corresponding to each of the tuners 137.

The processing subsystem 110 may also include an interactive content processor 140 configured to parse content data streams and generate, from data included in the content data streams, panes of interactive advertising content to be provided to the output device 112 for presentation to a user. An interactive advertising content pane may include a menu of interactive content that enables the user to navigate and select from different instances of interactive content. An exemplary interactive advertising control pane will be described further below.

The interactive content processor 140 may use content and associated information from one or more sources to dynamically generate interactive advertising control panes. For example, the processor 140 may use content and information received through the communication interface 131 (e.g., content descriptor tags and/or destination identifiers) and/or user input received through the receiver 132. In particular, the interactive content processor 140 may be configured to peel off interactive advertising content from the enhanced content data stream 127 and use the interactive advertising content or a subset thereof to generate a pane of interactive advertising content.

In certain embodiments, the generation of interactive advertising content panes may include operations configured to filter interactive content to be presented from the interactive content received from the content delivery subsystem 111. For example, as described above, the enhanced content data stream 127 may include interactive advertising content that has been selected by the network services provider 122 based on a geographic region to which media content will be provided. The interactive content processor 140 may be configured to further filter the region-specific interactive advertising content based on a more specific physical location of the content processing subsystem 110. For instance, the interactive content processor 140 may identify and use a destination identifier (e.g., an IP address of the processing subsystem 110) included in the enhanced content data stream 127 to select a subset of the interactive content included in the data stream 127 for inclusion in a pane of interactive advertising content to be provided to the output device 112. Accordingly, the interactive content provided to a user may be tailored specifically to the user based on the physical location of the processing subsystem 110 and/or other factors specific to the user.

Similarly, the contents of the interactive advertising control pane may be contextually selected based on the media content being provided to the output device 112 and/or user input received via the user input device 113. Accordingly, the contents of interactive advertising control panes may be dynamically adjusted as media content and/or user input changes.

In certain other embodiments, the second filtering described above may be performed by the network services provider 122 instead of the content processing subsystem 110. For example, the network services provider 122 may maintain an identifier (e.g., an IP address) for the content processing subsystem 110 and an associated location identifier (e.g., a street address for the user of the processing subsystem 110). This information can be used to filter interactive advertising content based on a specific location in situations where the network services provider 122 uses an IP address of the content processing subsystem 110 to provide the enhanced content data stream 127 to the processing subsystem 110.

As shown in FIG. 3, the processing subsystem 110 may also include a graphics engine 141 configured to generate graphics that are to be displayed by the output device 112. The graphics may include, but are not limited to, views of media content instances (e.g., "on-video" screen views), components of media content instances, program guides, interactive advertising content panes, content (e.g., interactive advertising menus) included in the interactive advertising content panes, and other graphics. One or more processors of the processing subsystem 110 (e.g., processor 138, interactive content processor 140, and graphics engine 141) may generate and provide output signals configured to cause the output device 112 to present contents of the output signals. Output signals may be provided to the output device 112 by way of the output driver 133.

The graphics engine 141 may include and/or operate hardware and/or software configured to combine different content together into a single display for concurrent presentation by the output device 112. For example, the graphics engine 141 may include an interactive display module 142 configured to generate a display including both media content and interactive content. The interactive display module 142 may dynamically update the display when a change in either the media content or the interactive content occurs. In certain embodiments, the interactive display module 142 is configured to overlay a layer of interactive content on a layer of media content such that both may be concurrently presented by the output device 112.

5. Application Clients

One or more applications 143-145 residing within the processing subsystem 110 may be executed upon initiation by a user of the processing subsystem 110, by network services provider 122, or by the occurrence of predefined events. The applications 143-145, or application clients, may reside in memory 135 or in any other area of the processing subsystem 110 and be executed by one or more processors (e.g., processor 138 and interactive content processor 140) of the content processing subsystem 110.

As shown in FIG. 3, one of the applications may be a program guide application 143 configured to generate a program guide that is displayed on the output device 112. The processing subsystem 110 may also include a personal video recording (PVR) application 144 configured to record media content and/or provide for the viewing of media content in normal or trick play mode. The PVR application 144 may also provide for media content recording functionality by enabling the temporary and/or permanent recording of media content to the storage device 134.

In some examples, the PVR application 144 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 144 is integrated into the processing subsystem 110 for illustrative purposes only.

The processing system 110 may also include an interactive content application 145, which may be initiated in any of the ways mentioned above. For example, a user may actuate a button of the input device 113 or other suitable input mechanism to cause an input signal to be sent to the processor subsystem 110, which receives and responds to the input signal by executing the interactive content application 145, or at least certain operations included in the interactive content application 145. In certain embodiments, actuation of the "interactive content" button 154 of the input device 113 during presentation of a media content instance (e.g., an "on-video" display of a video component of the media content instance) is configured to toggle between launching and closing the interactive content application 145. Other buttons or input mechanisms of the input device 113 may be configured for navigating and selecting interactive content presented by the output device 112.

In certain embodiments, the interactive content application 145 is configured to cause an interactive advertising content pane to be displayed along an edge of a media content instance (or a component of the media content instance) currently being displayed. The interactive advertising content pane may be displayed such that the display of the media content instance (or component of the media content instance) is generally unobstructed. For example, the displayed component of the media content instance may remain viewable, or at least substantially viewable, by the user. In certain embodiments, for example, the interactive advertising content pane "peeks in" from an outer edge of the viewing screen of the output device 112 and the display of the media content instance is resized to make room for the interactive advertising content pane. Alternatively, the interactive advertising content pane may overlay an edge portion of the media content instance being presented.

Figure 5:
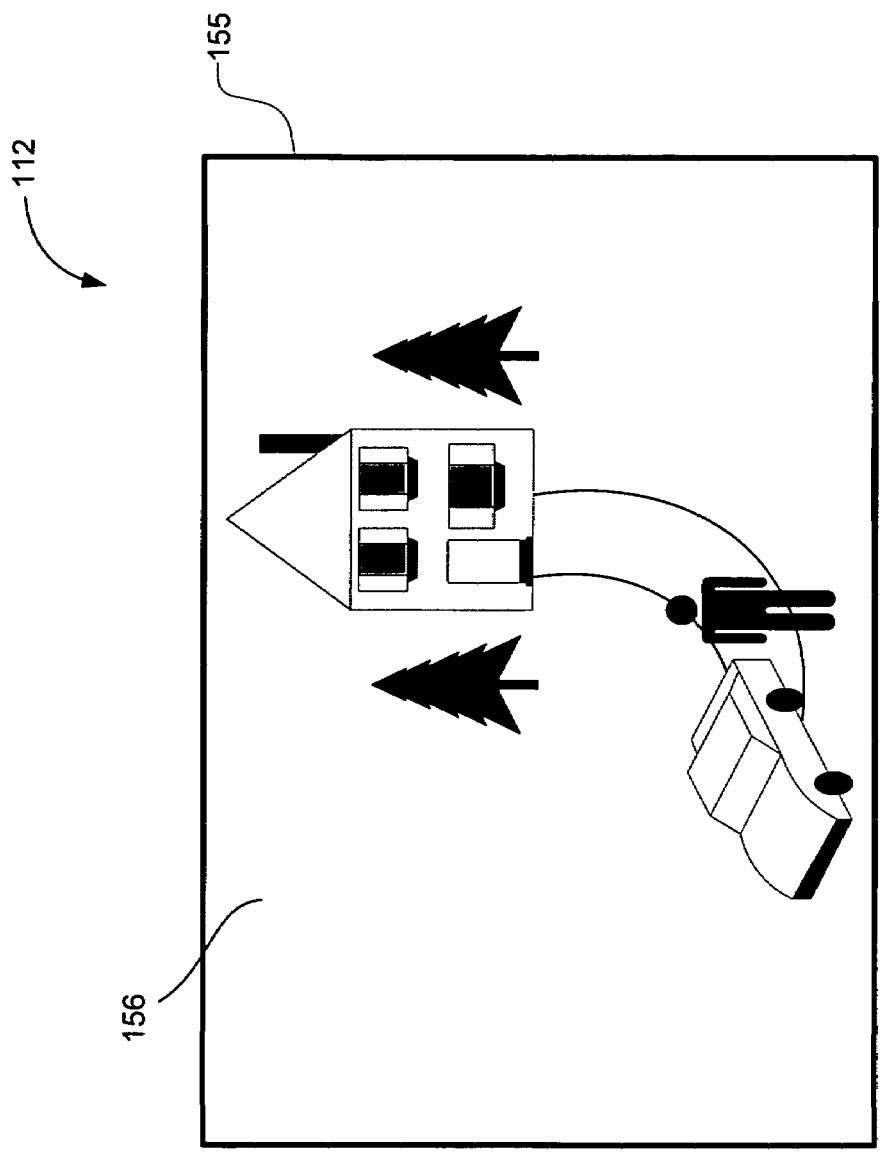
FIG. 5 illustrates a viewing screen of an exemplary output device with a particular scene or frame of media content displayed thereon, according to an embodiment.
Figure 6:
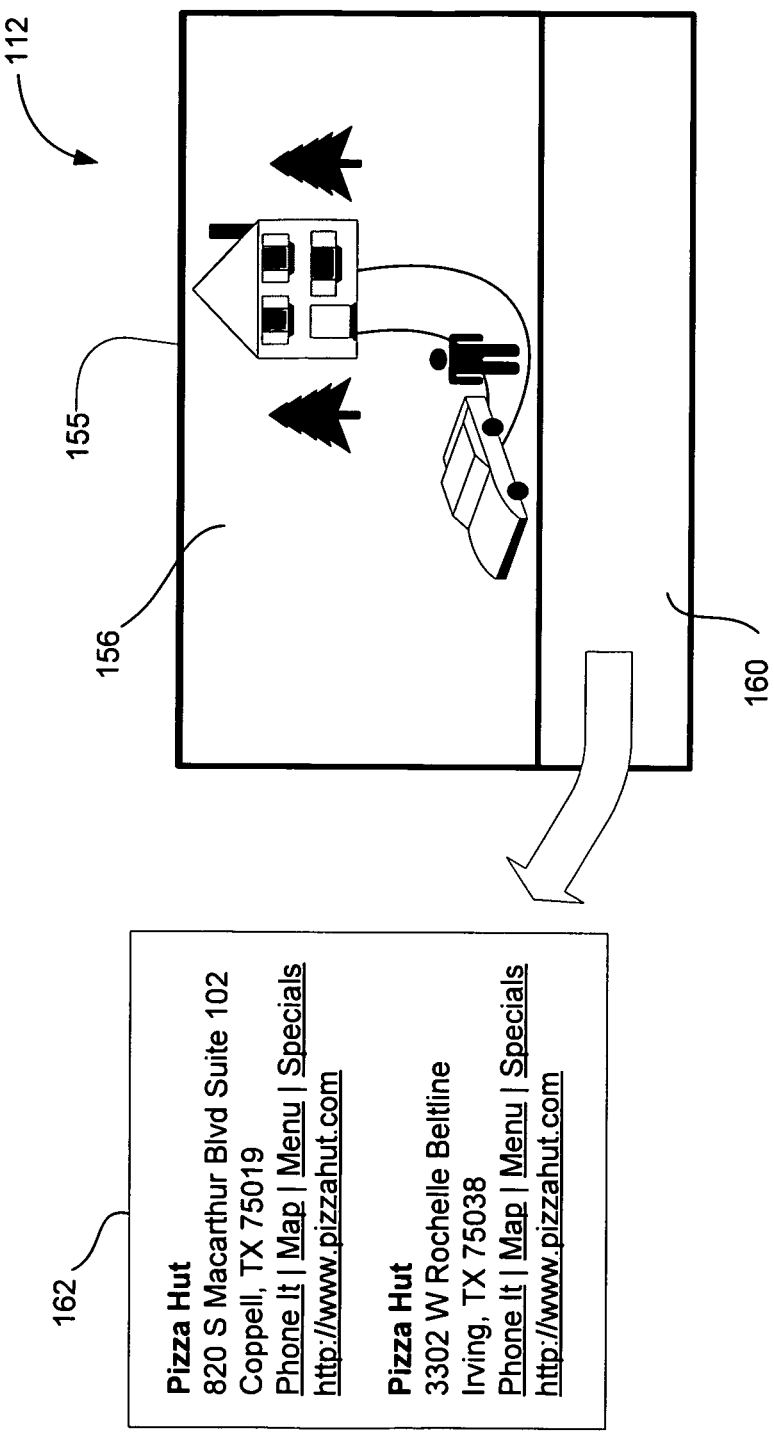
FIG. 6 illustrates the viewing screen of FIG. 5 with an interactive content pane displayed thereon together with the media content, according to an embodiment.
Figure 7:
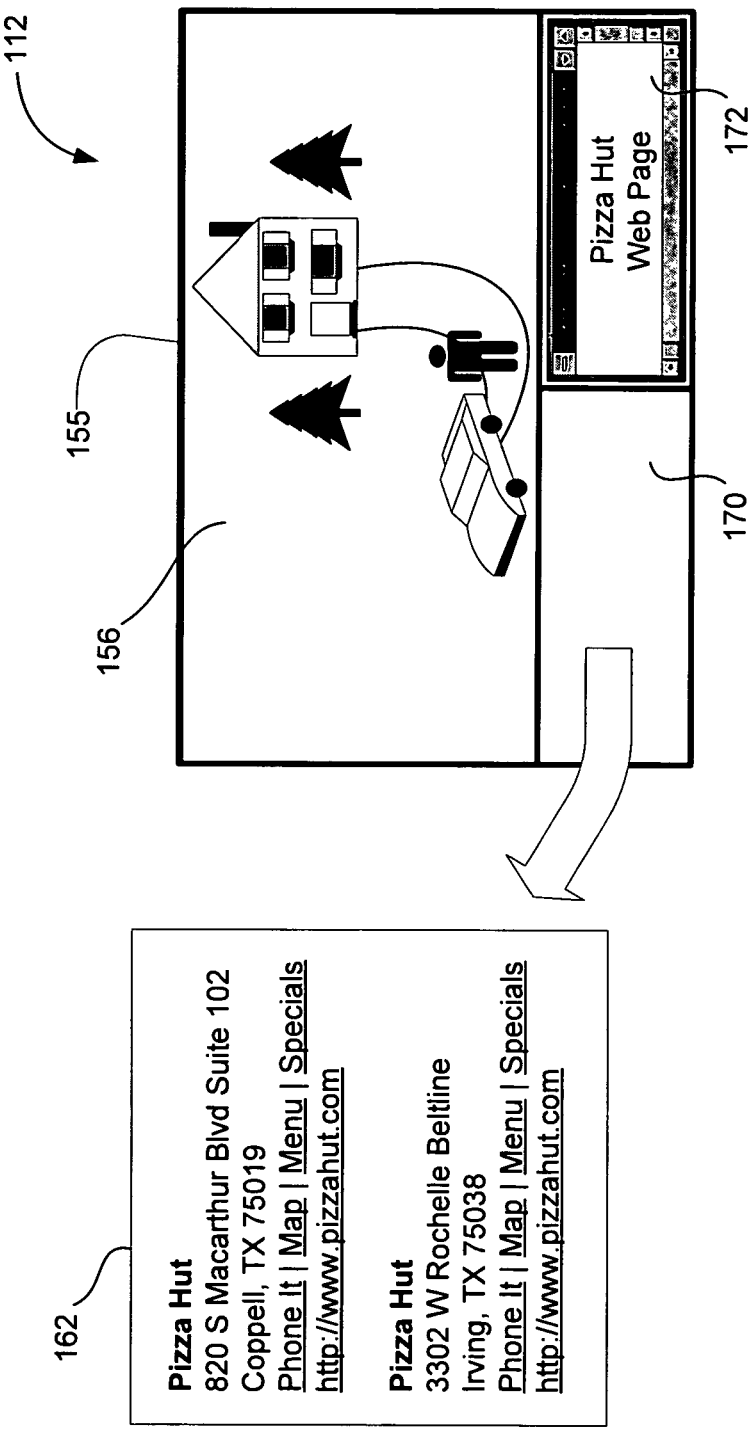
FIG. 7 illustrates the viewing screen of FIG. 5 with the interactive content pane of FIG. 6 including two separate display areas, according to an embodiment.

To facilitate an understanding of the interactive content application 145 and interactive content processor, FIGS. 5-7 illustrate various embodiments of views caused to be displayed on the output device 112 by the processing subsystem 110. FIG. 5 illustrates a viewing screen 155 of an exemplary output device 112 with a particular scene or frame of media content displayed thereon. The display of media content shown in FIG. 5 is indicated as reference number 156. As shown in FIG. 5, the media content is displayed substantially "full size" within the viewing screen 155, which is commonly referred to as an "on video" display.

The interactive content application 145 may cause any of the processes described above to be executed to provide interactive advertising content to be displayed within the viewing screen 155 together with the media content being displayed in FIG. 5. The occurrence of a predefined event may trigger presentation of interactive advertising content to a user. Examples of predefined events include, but are not limited to, the processing subsystem 110 receiving interactive advertising content from the content delivery subsystem 111, a user of the processing subsystem 110 subscribing to an interactive content service, a change in an attribute of media content being presented, and user input (e.g., the user actuating a preconfigured button of the input device 113). In some cases, when a predefined event is detected by the processing subsystem 110 during the presentation of a media content instance (e.g., an "on video" presentation such as that shown in FIG. 5), an interactive advertising content pane may be provided for presentation in the viewing screen 155 together with a display 156 the media content instance.

FIG. 6 illustrates the viewing screen 155 of FIG. 5 with an exemplary interactive content pane 160 displayed within the viewing screen 155 and adjacent to a first edge of media content display 156, which has been resized and shifted to make room for the interactive content pane 160 in the viewing screen 155. As shown in FIG. 6, the interactive content pane 160 may include a menu of interactive advertising content 162. In the embodiment of FIG. 6, the menu of interactive advertising content 162 includes directory listings having hyperlinks associated therewith. In this example, the directory listings are associated with Pizza Hut® locations located proximate to a physical location (e.g., a street address) of a user of the processing subsystem 110. The directory listings, which may be selected for presentation in any of the ways described above, may include selectable interactive content instances in the form of hyperlinks to additional content and/or functionality, which hyperlinks are represented as underlined text in FIG. 6. The directory listings shown in FIG. 6 are illustrative only and not limiting. Other forms or types of interactive advertising content may be used in other examples.

A user may utilize the user input device 113 to navigate and select instances of interactive content presented in the interactive content pane 160. For example, the user may use "arrow" and "select" buttons of the remote control device 113 shown in FIG. 4 to scroll through and select any of the hyperlinks shown in the interactive content pane 160. Of course, other suitable navigation and selection tools may be employed.

A user selection of an interactive content instance may initiate an input signal, which is received by the content processing subsystem 110. The processing subsystem 110 may be configured to respond to the input signal by accessing and providing additional information and/or functionality that has been pre-associated with a selected hyperlink. For example, upon selection of a "Phone It" hyperlink, the processing subsystem 110 may access a voice communication service (e.g., a VoIP phone service provided to the processing subsystem 110 over network 125) to initiate a voice call to a phone number associated with the corresponding Pizza Hut® listing. This feature may be selectively provided to subscribers subscribing to a voice communication service provided over the network 125. Similarly, a user selection of an "E-mail" hyperlink (not shown) may cause the processing subsystem 110 to access an e-mail application or service to instantiate an e-mail message to be sent to an e-mail address associated with the corresponding Pizza Hut® listing.

Other interactive content instances may provide access to other information or functionality. For example, the processing subsystem 110 may access and provide data representative of a geographic map, a menu of products, a list of specials, information about advertised services or products, price or rate quote information, images, a web page, or any other potentially useful information or functionality upon selection of the respective hyperlink that has been pre-associated with the information or functionality. By way of another example, a "Place Order" or "Shopping Cart" hyperlink may be pre-associated with functionality by which the user is able to go through the processing subsystem 110 to shop for and place an order for advertised products and/or services.

Additional information and/or functionality accessed by selection of an interactive content instance may be presented to the user together with the media content shown in FIG. 6. This enables the user to respond to advertising content by accessing additional information, communicating with an advertiser, or placing an order for advertised products or services, all while continuing to experience the media content display 156.

In certain embodiments, in response to a user selection of an interactive content instance, the processing subsystem 110 is configured to provide a separate display area for the additional information and/or functionality associated with the selected interactive content instance. In some examples, the interactive advertising content pane 160 may be divided into different display areas 170 and 172 as shown in FIG. 7, and display area 172 used for presentation of the additional information and/or functionality associated with the selected instance of interactive content.

The contents presented in the display area 172 may be based on user selections of interactive content shown in FIG. 6 such that selections of other interactive content instances may be configured to cause other information and/or functionality to be presented in display area 172, including any of the additional information or functionalities described above (e.g., a communication service, a geographic map, menu of products, list of specials, web page, electronic shopping cart, and order placement application). In FIG. 7, the additional information includes a web page (a Pizza Hut® web page in this example) corresponding with a web address hyperlink shown in FIG. 6. Thus, in response to a user selecting one of the web address hyperlinks shown in FIG. 6, display area 172 may be presented and include the corresponding web page. A web browser or mini web browser application may be employed in the display area 172 to provide the user with capabilities for interacting with the web page.

The processing subsystem 110 may access the web page by communicating with the third-party server 124 via the network 125. For example, Internet services provided to the processing subsystem 110 over the network 125 may be used. The third-party server may be operated by or otherwise associated with an advertiser sponsoring the interactive advertising content.

In the above-described manner, a user is able to act on advertising content, including contacting an advertiser, accessing additional information about advertised products or services, selecting advertised products or services, and placing an order, all while continuing to experience a presentation of media content (e.g., media content display 156). Because of the integration of the media content and interactive advertising content in a rich, interactive user interface, users are generally more likely to respond to an advertisement because doing so is convenient and seamless, and does not force the users to leave or interrupt presentations of media content.

As described above, the interactive advertising content pane 160 may be separated into multiple display areas 170 and 172. A menu of interactive content such as menu 162 shown in FIG. 6 may be included in display area 170, and the additional content and/or functionality (e.g., a web page) selected by the user may be included in display area 172. The user may utilize the input device 113 to navigate between the different sections displayed in the viewing screen 155 (e.g., media content display 156, display area 170, and display area 172), as well as within the display areas 170 and 172 including interactive content.

The contents presented in different display areas of the viewing screen 155 may be provided by different sources. For example, the media content included in display area 156 and the interactive advertising content included in display area 170 may be received as part of a primary feed such as the enhanced content data stream 127 provided by the network services provider 122 and including content from the media content provider 121 and the interactive advertising content source 123, while the interactive content included in display area 172 may be from another source such as the third-party server 124 as part of a secondary feed (e.g., an Internet services data stream). The processing subsystem 110 is able to combine contents received from different sources and/or from different feeds to generate and provide an integrated presentation of media and interactive content that enables a user to interactively respond to advertisements while continuing to experience media content being provided.

In some examples, the interactive content presented with a media content instance may be dynamically updated based on user input. For example, a user may select a particular instance of interactive content that is pre-associated with additional interactive content. The content processing subsystem 110 may respond to this user input by accessing the additional interactive content locally and/or remotely over the network 125. For example, the content processing subsystem 110 may provide a request for the additional interactive content to network services provider 122, which may obtain the additional interactive content from the interactive advertising content source 123 and update the enhanced content data stream 127 to include the additional interactive content. The content processing subsystem 110 may receive the updated, enhanced content data stream and use it to present the media content and updated interactive content to the user.

Accordingly, the interactive content presented to the user can be dynamically updated. For example, a first set of interactive content may include directory listings within a geographic area having a five mile radius. The user may provide instructions to change the radius to two miles, and the interactive content may be dynamically updated as described above, in response to the request. The interactive content may be similarly updated in response to other predefined events, including contextual changes in the media content being presented, for example.

A history of recently presented interactive content may be made accessible to a user. For example, the live cache buffer 136 may be used to store recent instances of interactive content. The amount of interactive content that may be stored in the live cache buffer can be capped at a predetermined limit such as a number of interactive content instances (e.g., ten) or a maximum amount of memory space. The interactive content application 145 may be configured to provide the user access to the history of interactive content stored in the live cache buffer 136. Accordingly, the user is able to access interactive content that may have been missed.

In some embodiments, media content may be changed based on user interactions with interactive content. For example, an interactive content instance may include a hyperlink to additional media content, such as a vignette of a media content instance available on the World Wide Web. Upon the user selecting the interactive content instance, the content processing subsystem 110 may access (over the network 125, for example) and provide the additional media content for presentation to the user in the display area 172. Along with the additional media content, the content processing subsystem 110 may also provide another interactive content instance that enables the user to move the presentation of the additional media content from the display area 172 to the main display area 156. Accordingly, a user can experience additional media content on a small scale and if so desired conveniently switch the presentation of the additional media content to the main display area 156 for a better viewing experience. Alternatively, the additional media content may be presented in the main display area 156 directly in response to the user selecting the corresponding hyperlink to the additional media content. Other embodiments may include other ways in which user interaction with the interactive content affects the media content being presented in the main display area 156.

C. Revenue from Interactive Advertising Content

Media content provider 121 and/or network services provider 122 may provide any of the interactive advertising content and functionality described above as a service to subscribers. The service may be provided free, as part of a package deal, or for an additional fee. Accordingly, the interactive content service can be used to generate revenue and/or attract customers.

Media content provider 121 and/or network services provider 122 may generate revenue by charging third parties such as advertisers for inclusion and/or utilization of content (e.g., advertising content) in the interactive content provided over the network 125. Significantly, because system 100 enables users to seamlessly respond to interactive content, the actual effectiveness of interactive content such as interactive advertisements can be determined by tracking user responses. The measured effectiveness can then be used to determine revenue sharing and/or to set advertising costs and revenues. For example, measured utilizations of interactive content can be used to determine revenue sharing between parties. Accordingly, advertising revenues are not limited to a fixed fee, and the media content provider 121 and the network services provider 122 can benefit from increased revenues when enough responses to interactive content are detected. Third parties such as advertisers can also benefit by paying for actual results. The results may be tracked and fees determined in any suitable manner, including using pay-per-selection (i.e., a user selects an interactive content instance), pay-per-communication (i.e., a user initiates a communication with a third party), or pay-per-order (i.e., a user places an order) payment plans. These are made possible by the system 100 being able to tie user actions to interactive content that facilitated the actions. The system 100 allows the media content provider 121 and the network services provider 122 to rent screen space to third parties (e.g., advertisers) on a revenue-sharing basis (e.g., a profit-sharing basis).

III. Exemplary Process Views

Figure 8:
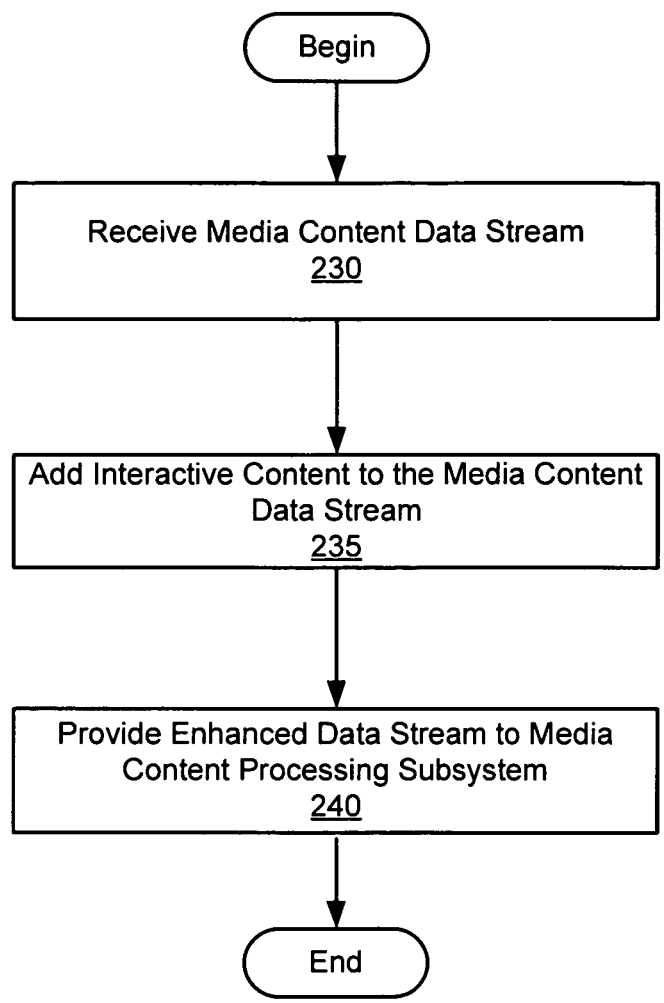
FIG. 8 is a flowchart illustrating an exemplary method of providing an enhanced content data stream, according to an embodiment.

FIG. 8 illustrates an exemplary method of providing an enhanced content data stream, according to an embodiment. While FIG. 8 illustrates exemplary steps according to one embodiment, other embodiments may omit, add to, reorder, and/or modify any of the steps shown in FIG. 8.

In step 230, a media content data stream is received. Step 230 may be performed in any of the ways described above, including the network services provider 122 receiving data stream 126 from the media content provider 121.

In step 235, interactive content is added to the media content data stream. Step 235 may be performed in any of the ways described above, including the network services provider 122 appending a layer of interactive advertising content to data stream 126.

In step 240, the enhanced data stream is provided to the content processing subsystem 110. Step 240 may be performed in any of the ways described above, including the network services provider 122 providing the enhanced data stream 127 to the content processing subsystem 110.

Figure 9:
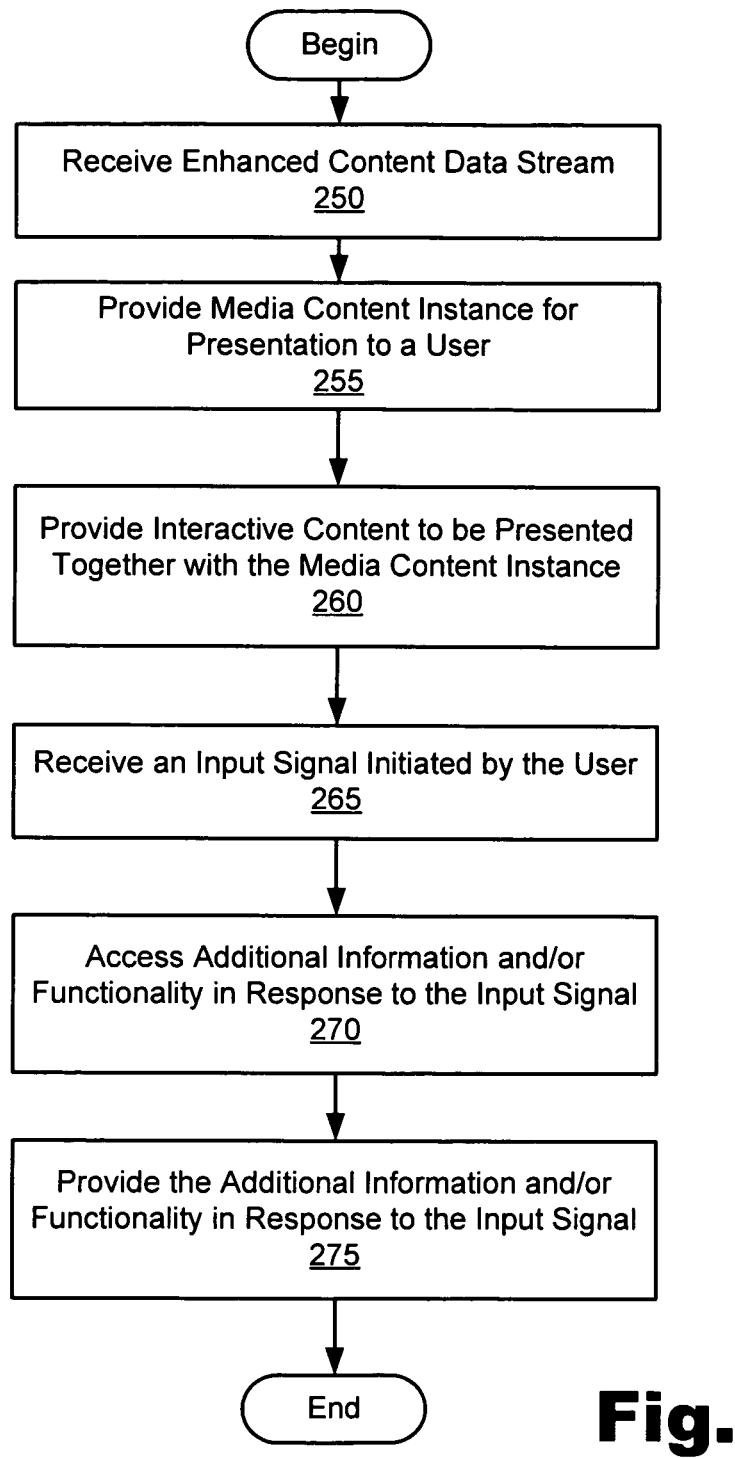
FIG. 9 is a flowchart illustrating an exemplary method of providing interactive advertising content together with a presentation of media content, according to an embodiment.

FIG. 9 illustrates an exemplary method of providing interactive advertising content together with media content, according to an embodiment. While FIG. 9 illustrates exemplary steps according to one embodiment, other embodiments may omit, add to, reorder, and/or modify any of the steps shown in FIG. 9.

In step 250, an enhanced content data stream is received. Step 250 may be performed in any of the ways described above, including the processing subsystem 110 receiving the enhanced data stream 127 provided by the network services provider 122 in step 240 of FIG. 9.

In step 255, a media content instance is provided for presentation to a user. Step 255 may be performed in any of the ways described above, including the processing subsystem 110 providing an output signal including data representative of the media content instance to the output device 112.

In step 260, interactive content is provided for presentation together with the media content instance. Step 260 may be performed in any of the ways described above, including the processing subsystem 110 dynamically generating a menu of interactive advertising content from the interactive content included in the enhanced data stream 127 and including data representative of the menu of interactive advertising content in an output signal that is provided to the output device 112. As described above, the media content instance and the menu of interactive advertising content may be presented together for concurrent consideration by the user.

In step 265, an input signal initiated by the user is received. Step 265 may be performed in any of the ways described above, including the user actuating an input mechanism of the input device 113.

In step 270, additional information and/or functionality is accessed in response to the input signal. Step 270 may be performed in any of the ways described above, including the content processing subsystem 110 accessing additional information and/or functionality locally from its data stores and/or from remote sources such as the interactive advertising content source 123 or third-party server 124.

In step 275, the additional information and/or functionality is provided in response to the input signal. Step 275 may be performed in any of the ways described above, including providing the additional information and/or functionality together with the interactive advertising content and the media content instance for concurrent presentation to the user. As described above, The media content instance, the interactive advertising content, and the additional information and/or functionality may be concurrently presented in three different areas of the viewing screen 155 of the output device 112 such that the user is able to navigate, select, or otherwise use the content to conveniently respond to advertising content while continuing to experience the media content instance.

As described above, the additional information described in steps 270 and 275 may include additional interactive content that may be dynamically added to the enhanced content data stream 127 for delivery to the content processing subsystem. Accordingly, steps 235 through 275 may be repeated to continually update the interactive content being provided to a user, based on the actions of the user.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. For example, while the preceding description has been directed to examples of interactive advertising content, this is not limiting. In other embodiments, interactive content may be of a type other than advertising content. The above description and accompanying drawings are accordingly to be regarded in an illustrative rather than a restrictive sense.

What is claimed is:
1. A system comprising:
 a content delivery subsystem configured to provide an enhanced content data stream, wherein said enhanced content data stream includes media content from a first source and interactive advertising content that is based on predefined criteria and is from a second source; and
 a content processing subsystem communicatively coupled to said content delivery subsystem, said content processing subsystem configured to:
  receive said enhanced content data stream, provide at least three separate viewing panes simultaneously on a display device, including a first viewing pane, a second viewing pane, and a third viewing pane;

provide said media content for presentation to said display device in said first viewing pane, provide, concurrent with providing said media content, at least a subset of said interactive advertising content for presentation to said display device in said second viewing pane, wherein the subset is related to said media content and includes a menu of selectable interactive content instances, wherein each of said selectable interactive content instances includes information corresponding to a business location located proximate to a user, wherein whether the business location is located proximate to the user is based on said predefined criteria, receive a selection of one of said interactive content instances, and provide, in response to the selection, said selected one of said interactive content instances for presentation to said display device in said third viewing pane concurrent with the presentation of said media content in said first viewing pane, without obstructing the presentation of said media content;

the first source, which is a media content provider configured to provide a media stream that includes said media content;

the second source, which is a network services provider configured to add said interactive advertising content to said media stream to form said enhanced content data stream, wherein the addition of said interactive advertising content is based on a context of said media stream and said predefined criteria;

wherein said network services provider is further configured to select said interactive advertising content to add to said media stream based on filtering of said interactive advertising content according to a geographic region to which said enhanced content data stream is provided, and said content processing subsystem is further configured to select said at least a subset of said interactive advertising content by filtering said interactive advertising content based on a specific physical location, within the geographic region, of the content processing subsystem, wherein the specific physical location is included in said predefined criteria.

2. The system of claim 1, wherein said interactive advertising content includes a plurality of directory listings obtained from an electronic directory service, and said content processing subsystem is further configured to provide at least a subset of said plurality of directory listings in said second viewing pane.

3. The system of claim 1, wherein a selection of one of said interactive content instances initiates access to at least one of additional information and functionality, and said content processing subsystem is further configured to automatically provide said additional information and information about said functionality in said third viewing pane.

4. The system of claim 3, wherein said content processing subsystem is further configured to provide said at least one of additional information and functionality while also providing said media content for presentation in said first viewing pane.

5. The system of claim 3, wherein said at least one of additional information and functionality provides tools configured to perform at least one of the following:

initiating a communication with an advertiser associated with said interactive advertising content;

obtaining additional information about at least one of the advertiser and an advertised product or service; and placing an order for an advertised product or service.

6. The system of claim 1, wherein a selectable interactive content instance included in said interactive advertising content initiates access to a voice communication service.

7. The system of claim 1, wherein said content processing subsystem is further configured to select said interactive advertising content based on a tag describing said media content.

8. The system of claim 1, wherein at least one of said content delivery subsystem and said content processing subsystem is configured to track utilizations of said interactive content instances, said utilizations being used to determine revenue sharing.

9. The system of claim 1, wherein said interactive advertising content is further based on a physical location associated with said content processing subsystem.

10. The system of claim 1, said content processing subsystem being further configured to toggle visibility of at least one of said second and said third viewing panes in response to a command from an input device.

11. The system of claim 1, said content processing subsystem being further configured to display at least one of said second and third viewing panes in response to a command included in said enhanced content data stream.

12. The system of claim 1, said content processing subsystem being further configured to move the presentation of said selected interactive content instance from said third viewing pane to said first viewing pane in response to a command from an input device.

13. The system of claim 1, said content processing subsystem being further configured to receive said menu of selectable interactive content instances from the first source, and receive said interactive content instances from the second source.

14. The system of claim 1, said content processing subsystem being further configured to:

store a history of recently presented interactive advertising content in a live cache buffer of said content processing subsystem; and provide access to said history of interactive advertising content stored in said live cache buffer to provide access to interactive advertising content that may have been missed.

15. The system of claim 1, wherein the second source is a network services provider configured to add said interactive advertising content to said content data stream to form said enhanced content data stream, wherein the addition of said interactive advertising content is based on a context of at least one of said media stream and said predefined criteria.

16. The system of claim 15, wherein said predefined criteria include content descriptor tags for said media content, wherein the content descriptor tags are utilized to add said interactive advertising content when the addition of said interactive advertising content is based on said context of said media stream.

17. The system of claim 1, wherein said predefined criteria include advertiser information and subscriber attributes, wherein said advertiser information includes said business locations for each of said selectable interactive content instances and wherein said subscriber information includes a subscriber location utilized to determine whether each of said business locations are located proximate to the user.

18. The system of claim 1, wherein said predefined criteria include a user specified location that when selected causes said menu of said selectable interactive content instances to present selectable interactive content instances that correspond to business locations proximate to said user specified location.

19. An apparatus comprising:
a communication interface configured to receive an enhanced content data stream from a content delivery subsystem communicatively coupled to said apparatus by a network, wherein said enhanced content data stream includes media content in the form of a media stream from a media content provider and interactive advertising content from a network services provider, wherein said interactive advertising content is based on predefined criteria and includes a menu of selectable interactive content instances; and
at least one processor configured to
provide at least three separate viewing panes on a display device, including a first viewing pane, a second viewing pane, and a third viewing pane;
provide said media content in said first viewing pane of said display device,
provide, concurrent with providing said media content, at least a subset of said menu of selectable interactive content instances in said second viewing pane, wherein each of said selectable interactive content instances includes information corresponding to a business location located proximate to a user, wherein whether the business location is located proximate to the user is based on said predefined criteria,
receive a selection of one of said interactive content instances, and
provide, in response to the selection, said selected one of said interactive content instances in said third viewing pane concurrent with said media content in said first viewing pane, wherein said interactive advertising content and said selected interactive content instance are provided without obstructing said media content;
wherein an addition of said interactive advertising content is based on a context of said media stream and said predefined criteria;
said interactive advertising content selected to add to said media stream based on filtering of said interactive advertising content according to a geographic region to which said enhanced content data stream is provided, and
at least a subset of said interactive advertising content selected by filtering said interactive advertising content based on a specific physical location, within the geographic region, of the apparatus, wherein the specific physical location is included in said predefined criteria.

20. The apparatus of claim 19, further comprising:
a receiver configured to receive an input command from an input device communicatively coupled to said apparatus, wherein said at least one processor is further configured to
access at least one of additional information and functionality in response to said input command, and
provide said additional information and information about said functionality in said third viewing pane.

21. The apparatus of claim 20, wherein said at least one of additional information and functionality includes a voice communication service.

22. The apparatus of claim 19, wherein said processor is further configured to select said interactive advertising content based on a tag describing said media content.

23. The apparatus of claim 19, said at least one processor being further configured to toggle visibility of at least one of said second and said third viewing panes in response to a command from an input device.

24. The apparatus of claim 19, said at least one processor being further configured to display at least one of said second and third viewing panes in response to a command included in said enhanced content data stream.

25. The apparatus of claim 19, said at least one processor being further configured to move the presentation of said selected interactive content instance from said third viewing pane to said first viewing pane in response to a request from an input device.

26. The apparatus of claim 19, said at least one processor being further configured to receive said menu of selectable interactive content instances from a first source, and receive said interactive content instances from a second source.

27. A method comprising:
receiving an enhanced content data stream from a content delivery subsystem, said enhanced content data stream including a media content instance and interactive content, said interactive content including a menu of selectable interactive content instances and being based on predefined criteria;
providing said media content instance and at least a subset of said interactive content included in said enhanced content data stream to a display device for concurrent presentation,
providing at least three separate viewing panes to a display device concurrently;
providing said media content instance in a first viewing pane,
providing said menu of the at least the subset of selectable interactive content instances in a second viewing pane, wherein each of said selectable interactive content instances includes information corresponding to a business location located proximate to a user, wherein whether the business location is located proximate to the user is based on said predefined criteria,
receiving a selection of one of said interactive content instances, and
providing, in response to the selection, said selected one of said interactive content instances to said display device for presentation in a third viewing pane concurrent with providing the presentation of said media content instance in said first viewing pane, without obstructing the presentation of said media content instance;
basing the addition of said interactive content to form said enhanced content data stream on a context of said media content instance and said predefined criteria;
filtering said menu of selectable interactive content instances based on a geographic region to which said media content instance is provided, and
filtering of said interactive content based on a specific physical location, within the geographic region, of the display device to identify said at least the subset of said interactive content instances, said specific physical location being included in said predefined criteria.

28. The method of claim 27, further comprising:
providing access to at least one of additional information and functionality in response to said selection, said additional information and information about said functionality being provided in said third viewing pane.

29. The method of claim 28, wherein said providing access to at least one of additional information and functionality is performed without navigating away from said presentation of said media content instance.

30. The method of claim 28, wherein said providing access to at least one of additional information and functionality includes at least one of:
  initiating a communication with a third party associated with said interactive content;
  obtaining additional information about at least one of the third party and a product or service; and
  placing an order for the product or service.

31. The method of claim 28, wherein said providing access to at least one of additional information and functionality includes:
  requesting additional interactive content;
  receiving an updated enhanced content data stream including said additional interactive content and said media content instance; and
  providing said additional interactive content and at least a component of said media content included in said updated enhanced content data stream to the display device for concurrent presentation.

32. The method of claim 27, further comprising:
  tracking utilizations of said interactive content based at least in part on the selection of one of said interactive content instances; and
  using said utilizations to determine revenue sharing with a third party.

33. The method of claim 27, further comprising selecting said interactive content based on a tag describing said media content.

\* \* \* \* \*